(12) United States Patent
Leoni

(10) Patent No.: US 7,775,451 B2
(45) Date of Patent: Aug. 17, 2010

(54) VARIABLE FLOW MIXING VALVE

(75) Inventor: Frederic Leoni, Baslieux (FR)

(73) Assignee: Delphi Technologies, Inc., Troy, MI (US)

( * ) Notice: Subject to any disclaimer, the term of this patent is extended or adjusted under 35 U.S.C. 154(b) by 474 days.

(21) Appl. No.: 11/827,117

(22) Filed: Jul. 10, 2007

(65) Prior Publication Data

US 2008/0173722 A1 Jul. 24, 2008

(30) Foreign Application Priority Data

Jul. 21, 2006 (GB) .................................. 0614465.3
Apr. 13, 2007 (EP) .................................. 07106180

(51) Int. Cl.
*F24F 7/00* (2006.01)
*G05D 23/00* (2006.01)
*F25D 17/04* (2006.01)

(52) U.S. Cl. ........................ 236/49.5; 62/186; 236/49.1; 236/13; 454/333; 454/334

(58) Field of Classification Search .................... 62/177, 62/186, 404; 236/12.1, 12.11, 12.15, 13, 236/49.1, 49.3, 49.4, 49.5; 454/333, 334
See application file for complete search history.

(56) References Cited

U.S. PATENT DOCUMENTS

| | | | | |
|---|---|---|---|---|
| 4,328,926 A | * | 5/1982 | Hall, Jr. ........................ | 236/13 |
| 4,517,809 A | * | 5/1985 | Hoyt ............................ | 62/183 |
| 6,224,480 B1 | * | 5/2001 | Le et al. ..................... | 454/160 |
| 2006/0032260 A1 | * | 2/2006 | Kang ........................... | 62/317 |

FOREIGN PATENT DOCUMENTS

EP   1 070 611    6/2006

* cited by examiner

*Primary Examiner*—Frantz F. Jules
*Assistant Examiner*—Daniel C Comings
(74) *Attorney, Agent, or Firm*—Patrick M. Griffin

(57) ABSTRACT

The invention relates to a variable flow mixing valve for use in a Heating Ventilation and Air Conditioning module. The module is particularly suited for use in a vehicle. The variable flow mixing valve includes drive means which drive a mixing door and a baffle between various positions in order to allow a relatively warm flow of air, from a first chamber, to mix with a relatively cool flow of air from a second chamber. The baffle and door are linked in such a way as to provide an aperture therebetween through which, in use, the first and/or second flows of air pass. A parking area is also provided for the baffle and is shaped in order to reflect airflow back toward the first and second chambers.

2 Claims, 7 Drawing Sheets

VARIABLE FLOW MIXING VALVE

TECHNICAL FIELD OF INVENTION

The present invention relates to a variable flow mixing valve, particularly, but not exclusively, a variable flow mixing valve used to control mixture of air within the Heating Ventilation and Air Conditioning (HVAC) module of an automobile.

BACKGROUND OF INVENTION

HVAC modules in automobiles typically have an inlet for allowing air into the module (often from a blower), outlets for controlling exit of air from the HVAC into the automobile interior, an evaporator for selectively cooling the air passing through the module and a heater core for selectively warming air passing through the module. In order to provide desirable temperature conditions within the vehicle interior, means for selecting and mixing warm air from the heater core and cool air from the evaporator are required.

The mixing operation is typically performed using a pair of doors which can regulate the relative amounts of cool air and warm air which mix to provide the resultant flow output. A problem with current systems is that the cool air and warm air often do not mix properly before the flow of air is expelled into the vehicle interior. This results in inefficiency and can lead to undesirable temperature conditions within the automobile interior. Another problem with typical systems is that when either full hot mode (where no cool air is required) or full cold mode (where no warm air is required) is selected, there is often a small amount of leakage of the undesired air into the stream. This leads to the module outputting either slightly warmer or slightly cooler air than would otherwise be possible.

SUMMARY OF THE INVENTION

According to the present invention there is provided a variable flow mixing valve for a Heating Ventilation and Air Conditioning module, the variable flow mixing valve comprising drive means in communication with a mixing door for selectively allowing a first flow of air from a first chamber, a baffle for selectively allowing a second flow of air from a second chamber, linking means linking the mixing door and the baffle in such a way as to provide an aperture between the mixing door and the baffle through which, in use, the first and/or second air flows pass.

Preferably, the linking means comprises a plurality of link members extending between the mixing door and the baffle such that driving communication is provided between the mixing door and the baffle. More preferably, a pair of link members are provided between the mixing door and the baffle.

Preferably, the link means have a cammed profile.

Optionally, a pair of variable flow mixing valves according to the present invention are provided side by side.

Optionally, the pair of valves are synchronized with one another in order to provide a single temperature output having an increased throughput capacity. Typically, the pair of variable flow mixing valves are synchronized by a rigid link therebetween.

Alternatively, the pair are synchronized by appropriate control of the drive means.

Alternatively, the pair of valves are provided with independent drive means which allow them to be independently actuated.

Typically, the first flow of air from the first chamber is relatively warm and is optionally heated by a heater core located within the first chamber.

Typically, the second flow of air from the second chamber is relatively cool and is optionally cooled by an evaporator located within the second chamber.

Preferably, the baffle is provided on tracks within a parking area which houses the baffle in its various operative positions. More preferably, the parking area further comprises tracks which guide the baffle therein.

Preferably, the baffle is curved. Optionally, the baffle and linking members are formed from a single piece of material to provide an integrated baffle and linking means.

Preferably, the parking area is adapted to cause any air flowing into the parking area to be reflected back toward the second chamber. More preferably, the parking area is a longitudinal chamber having an opening at one end to accept the baffle.

Preferably, the baffle is provided with a sealing surface which prevents undesired flow of air past the baffle when the baffle is in a closed position. Typically, the sealing surface comprises a lip protruding from a face of the baffle.

Preferably, the mixing door is provided with a sealing surface which prevents undesired flow of air past the mixing door when the mixing door is in a closed position.

Typically, the drive means comprises an electric motor. Alternatively, the drive means comprises some other form of actuator such as a Bowden or rotary cable.

Further features and advantages of the invention will appear more clearly on a reading of the following detail description of the preferred embodiment of the invention, which is given by way of non-limiting example only and with reference to the accompanying drawings.

BRIEF DESCRIPTION OF DRAWINGS

Embodiments of the variable flow mixing valve according to the present invention will now be described, by way of example only, with reference to the accompanying drawings, in which:—

DETAILED DESCRIPTION OF INVENTION

Figure 1:
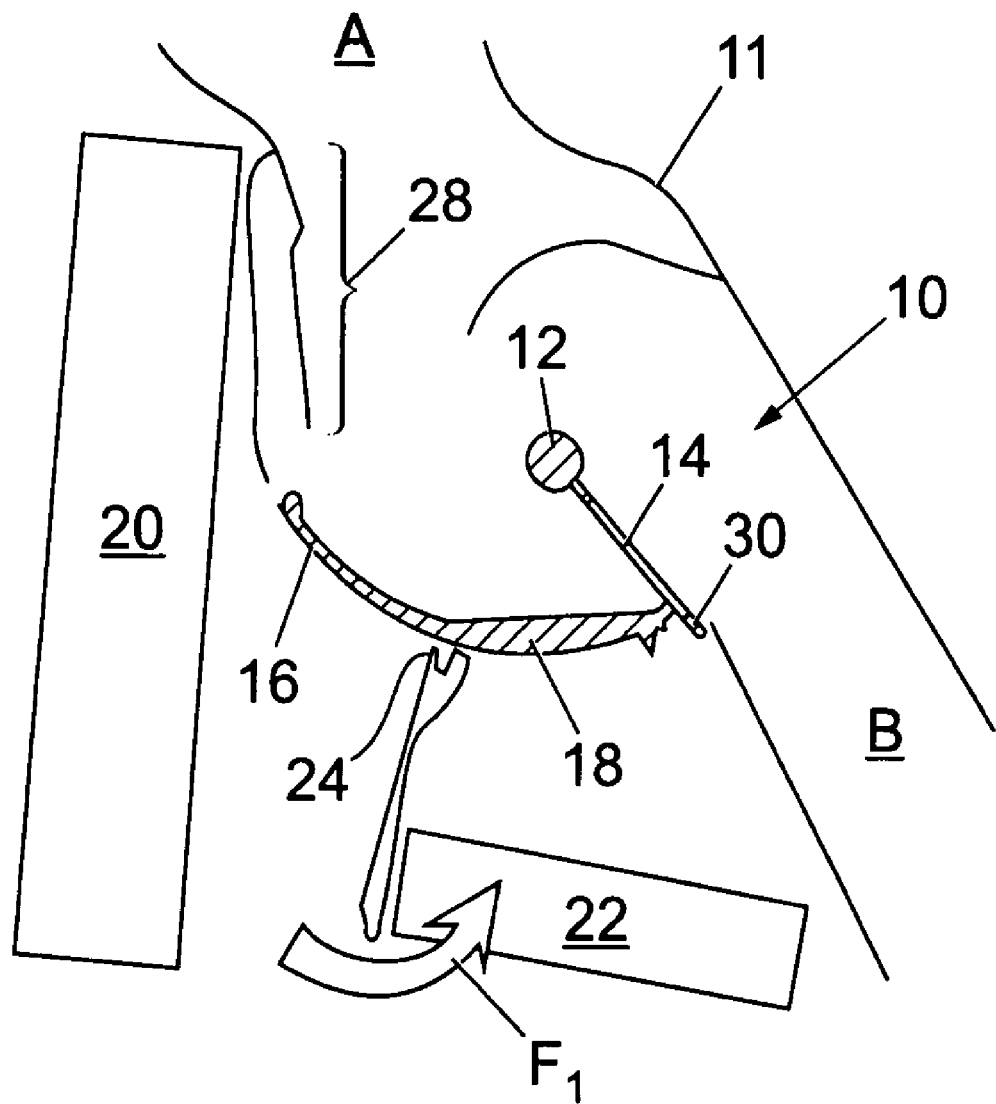
FIG. 1 is a transverse view of the variable flow mixing valve in a full hot position according to the present invention.

Variable flow mixing valve 10 is shown installed in an HVAC module comprising a housing 11 having outlets A and B. Mounted in a first chamber of the housing 11 is an evaporator 20 and in a second chamber of the housing is a heater core 22. In use, air flow passes into the HVAC module (under the action of a blower (not shown)) through the evaporator 20 past the variable flow mixing valve 10 and out into the vehicle interior through outlets A and B.

Variable flow mixing valve 10 comprises drive means (not shown) on a hinge pin 12 which allows a mixing door 14 to be opened and closed. The mixing door 14 is connected to a corresponding baffle 16 by link means comprising link members 18.

Figure 2:
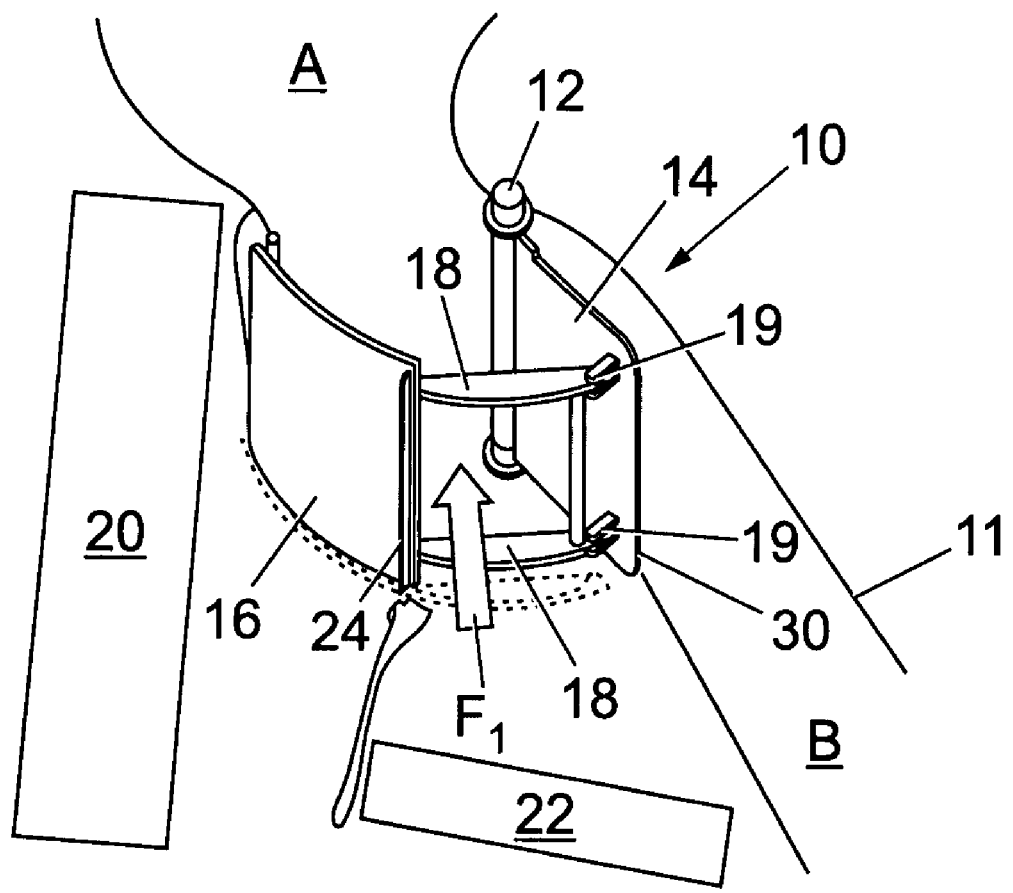
FIG. 2 is a schematic perspective view taken from the underside of the valve of FIG. 1.

With reference to FIG. 2, the baffle 16 is curved and is provided with a sealing lip 24. The housing 11 is also provided with a parking area 28 which accepts the baffle 16 when not in use, as described subsequently. The parking area 28 also has tracks (not shown) which help guide the baffle as it moves between the open and closed position. The mixing door also has a sealing lip 30 which will be described subsequently.

Figure 4:
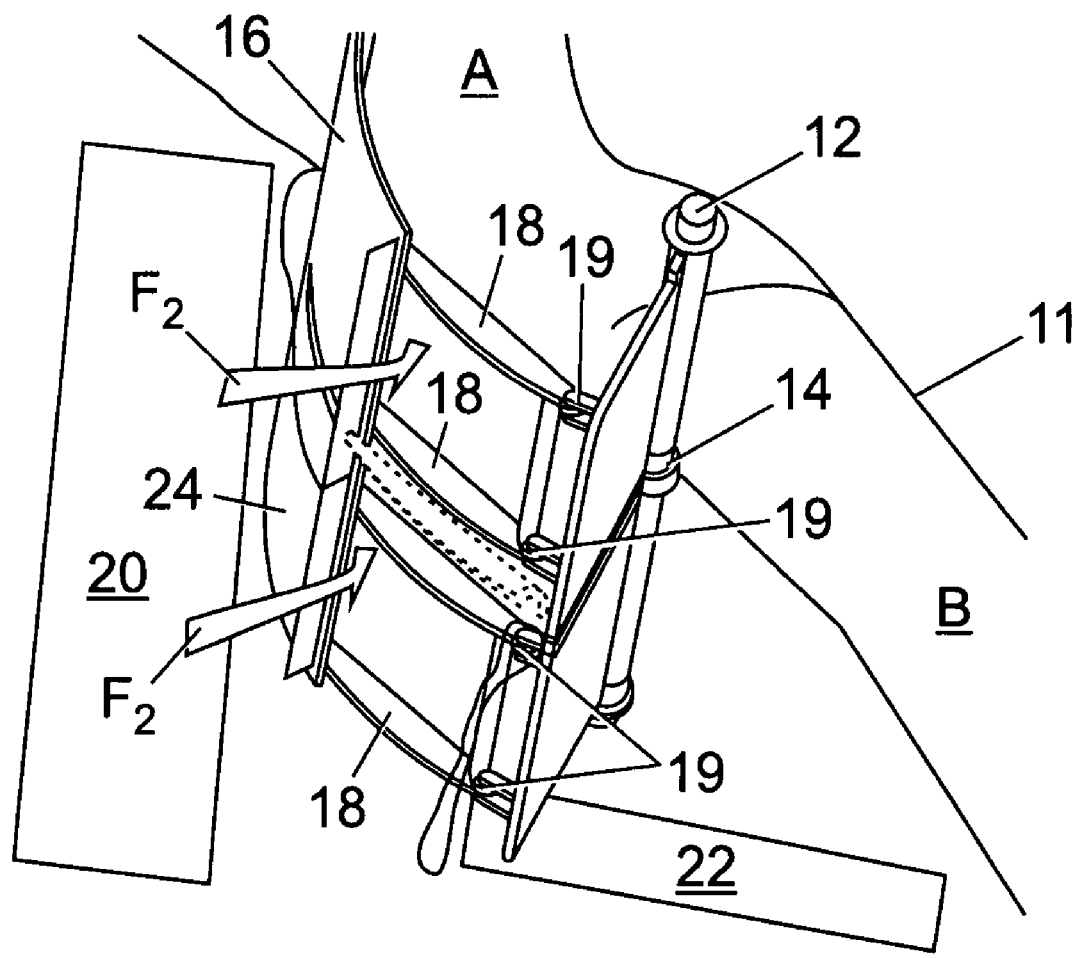
FIG. 4 is a schematic perspective view taken from the underside of the valve of FIG. 3.
Figure 6:
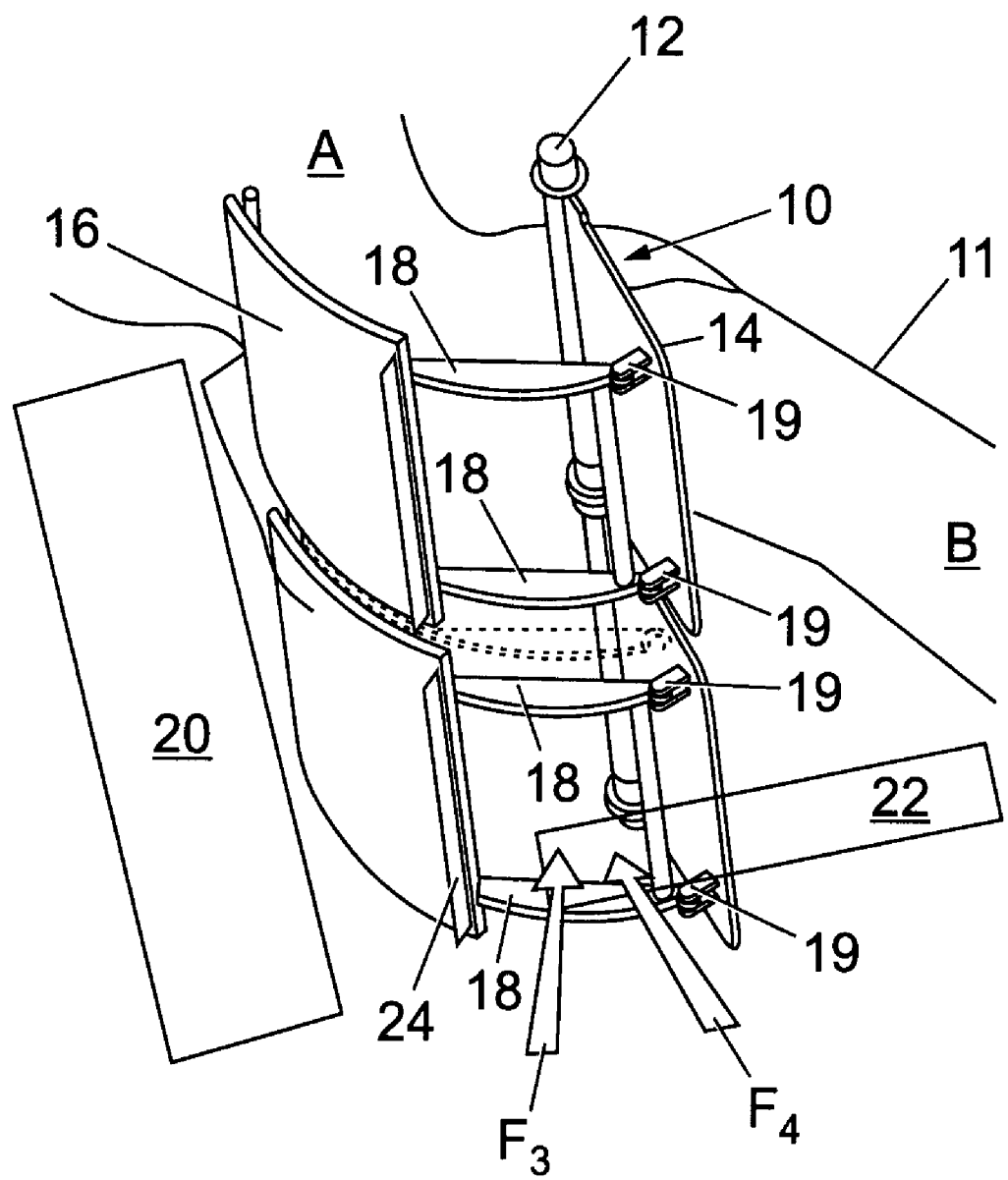
FIG. 6 is a schematic perspective view taken from the underside of the valve of FIG. 5.

As best shown in FIGS. 2, 4 and 6, the link members 18 have a cammed shape which matches the curve of the baffle 16 and are mounted flush there against. A pair of link members 18 are provided between the mixing door 14 and the baffle 16 to provide stability. Each link member 18 is attached to the door 14 by a hinged connection 19. The mixing door 14 may be regarded as a motion valve and the baffle 16 as a slave valve.

Referring to FIGS. 1 and 2, in use, when a maximum heating effect is desired from the HVAC module, the drive means locates the mixing door 14 in the fully open position. In this position, the engagement provided by the link members 18 causes the baffle 16 to fully close the aperture from the evaporator 20. This causes all air flow to flow past the heater core 22 as indicated by arrow F1.

In the arrangement depicted by FIGS. 3 to 6, a pair of valves are situated side by side in order to increase the capacity of the valve for an automobile having a single temperature zone. Alternatively, these side by side valves can be moved independently in order to simultaneously provide two different output temperatures for e.g. the driver and passenger side of the vehicle.

Figure 3:
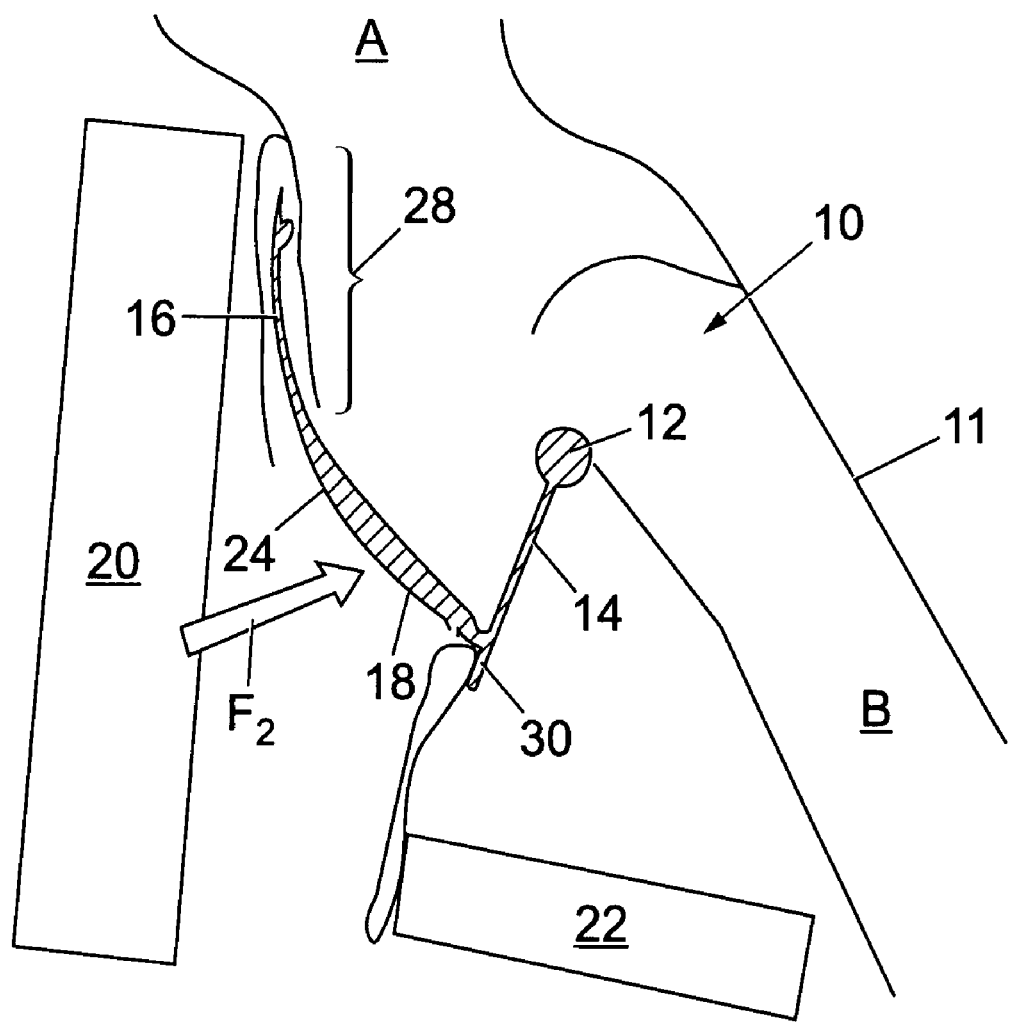
FIG. 3 is a transverse view of the variable flow mixing valve in a full cold position.

Referring to FIG. 3, when a maximum cooling effect is desired from the HVAC module, the drive means drives the mixing door 14 into the fully closed position to prevent air flowing from the heater core 22 to the outlets A, B. In this position, the engagement provided by the link members 18 causes the baffle 16 to fully open the aperture from the evaporator 20. This causes all air to flow past the evaporator 20 and link members 18 as indicated by arrow F2. In this position, the curved nature of the baffle 16 and the corresponding shape of the parking area 28 causes any component of the flow F2 entering the housing 16 to be reflected back down toward the outlets. Furthermore, the sealing lip 30 protruding from the end of the mixing door 14 creates an effective seal to prevent any leakage of air flow between the evaporator 20 and heater core 22 past the mixing door 14. This increases the efficiency of the valve.

Since the parking area 28 houses the full extent of the baffle 16 when the valve 10 is in the full cold position, the valve is able to allow a relatively large air flow to pass through the aperture created by the link members 18 with minimal disturbance to the air flow.

Figure 5:
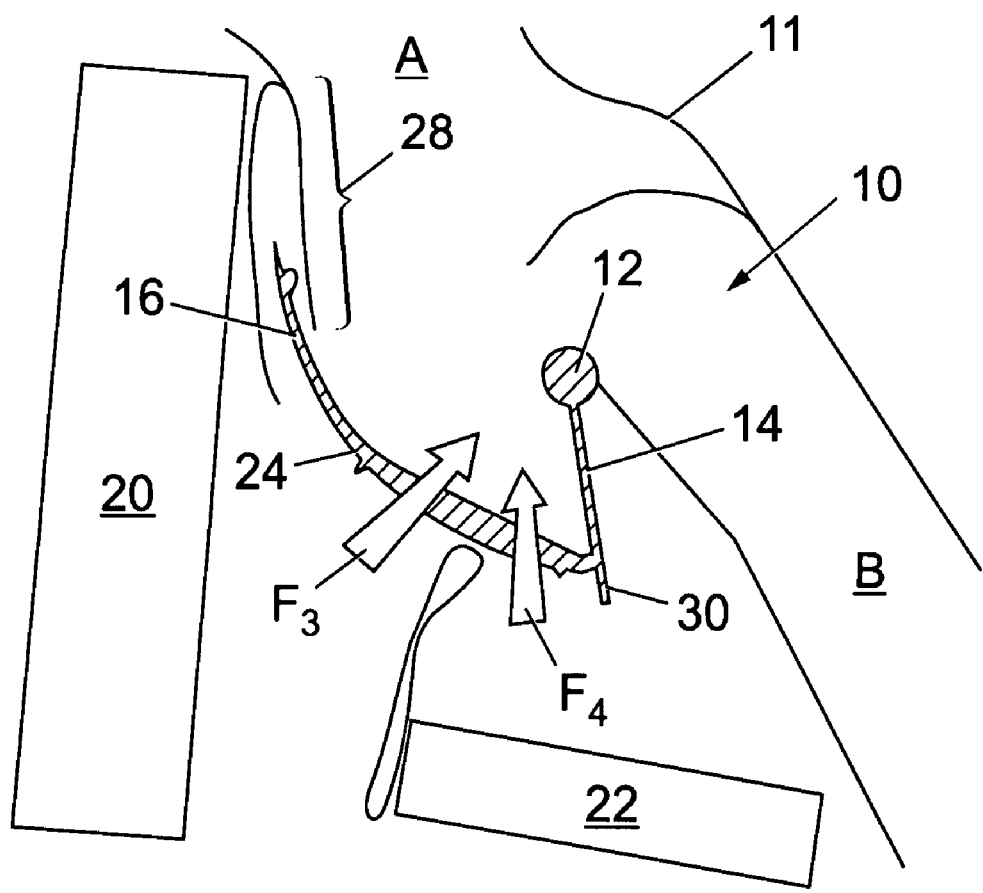
FIG. 5 is a transverse view of the variable flow mixing valve in a 50/50 mix position.

Referring to FIGS. 5 and 6, when a mixture of warm and cool air is required, the drive means is drives the mixing door 14 to a partially open position. In the example shown, the mixing door 14 is positioned to provide a mixed air flow comprising approximately 50% cool air (indicated by arrow F3) from the evaporator 20 and approximately 50% warm air (indicated by arrow F4) from the heater core 22. Clearly any percentage of mixture, and hence any reasonable resultant temperature, may be provided simply by opening the mixing door 14 to a greater or lesser extent.

As illustrated in FIG. 5, as the mixing door 14 opens, the cool air flow F3 will firstly start to flow past the resultant aperture below the lip 24 of the baffle 16. This has the advantage of allowing the air flows F3 and F4 to immediately mix with one another. This means that there is no inefficiency in the mixing process typical of prior systems where the geometry of the valve causes the cool and warm air flows to mix with one another from points which are relatively far apart. If desired, the arrangement allows additional mixing valves to be moulded to the mixing door 14 in order to further improve mixture of the air flow.

The arrangement also has the advantage of providing a compact valve arrangement which is easy and relatively cheap to manufacture.

Figure 7:
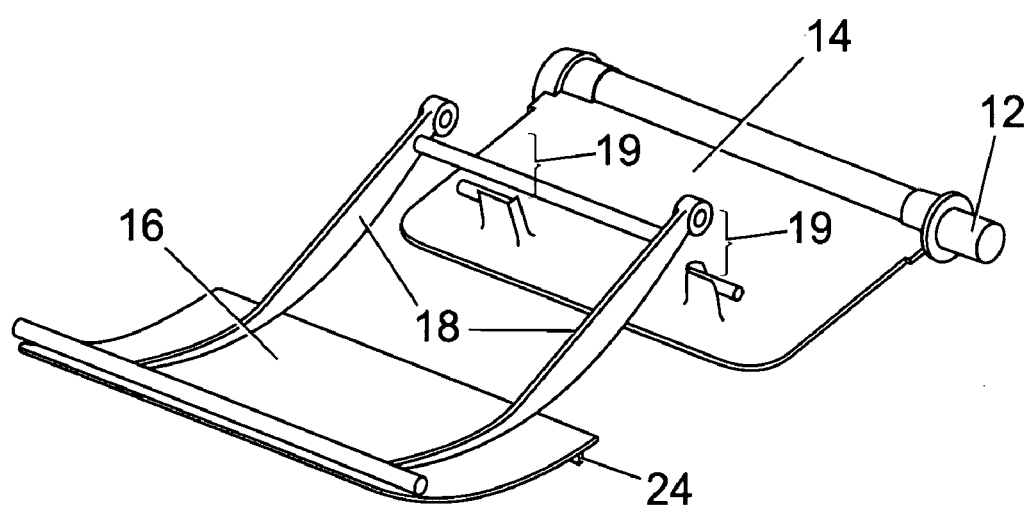
FIG. 7 is a modified variable flow mixing valve having integrated baffle and link members.

Modifications, and improvements may be made to the foregoing without departing from the scope of the invention. For example, as shown in FIG. 7, rather than having separate linking members 18, the linking members may be moulded with the baffle 16 to provide an integrated baffle. This may be preferable over the discrete element version previously described since it reduces the cost and complexity of manufacture and assembly of the valve.

While this invention has been described in terms of the preferred embodiments thereof, it is not intended to be so limited, but rather only to the extent set forth in the claims that follow.

I claim:

1. A variable flow mixing valve for a heating ventilation and air conditioning module, the variable flow mixing valve comprising:

drive means in communication with a mixing door for selectively allowing a first flow of air from a first chamber, a baffle for selectively allowing a second flow of air from a second chamber, and linking means linking the mixing door and the baffle in such a way as to provide an aperture between the mixing door and the baffle through which, in use, the first and/or second air flows pass;

wherein the linking means comprises a plurality of link members extending between the mixing door and the baffle such that driving communication is provided between the mixing door and the baffle;

wherein the link members have a cammed profile;

wherein the baffle is provided on tracks within a parking area which houses the baffle in its various operative positions, the parking area comprising tracks which guide the baffle therein; and wherein the baffle is curved and the baffle and linking members are formed from a single piece of material to provide an integrated baffle and linking means.

2. The variable flow mixing valve according to claim 1, wherein the parking area is adapted to cause any air flowing into the parking area to be reflected back toward the second chamber.

* * * * *